United States Patent

[11] 3,616,903

| [72] | Inventor | Edward L. Cicero<br>52-62 66th St., Maspeth, N.Y. 11378 |
|---|---|---|
| [21] | Appl. No. | 823,691 |
| [22] | Filed | May 12, 1969 |
| [45] | Patented | Nov. 2, 1971 |

[54] BIRD SEED CLEANING DEVICE
10 Claims, 3 Drawing Figs.

[52] U.S. Cl. ................................................... 209/139 R,
 209/154, 119/17
[51] Int. Cl. ..................................................... B07b 7/00
[50] Field of Search ........................................... 209/20, 36,
 37, 133, 138, 139, 139 A, 144, 154, 237, 466, 145,
 208, 209, 142; 417/478

[56] References Cited
UNITED STATES PATENTS

| 233,847 | 11/1880 | Groom | 209/142 |
| 834,185 | 10/1906 | Campbell | 417/478 |
| 1,309,879 | 7/1919 | Davids et al. | 209/144 |
| 3,024,908 | 3/1962 | Ibing et al. | 209/144 |

FOREIGN PATENTS

| 884,900 | 7/1953 | Germany | 209/144 |

Primary Examiner—Frank W. Lutter
Assistant Examiner—William Cuchlinski, Jr.
Attorney—Edward L. Cicero ABSTRACT: A portable apparatus for removing the expended husks from bird seed mixtures after the bird has shelled the seeds and left the husks among the seeds includes a receptacle, a perforate detachable cover having a perforate deflector extending downwardly into the receptacle, air supply means extending through the cover into the receptacle and a husk receiving chamber in the receptacle. The airstream agitates the mixture in the receptacle and floats the husks upwardly for collection in the husk receiver while the air exhausts through the cover.

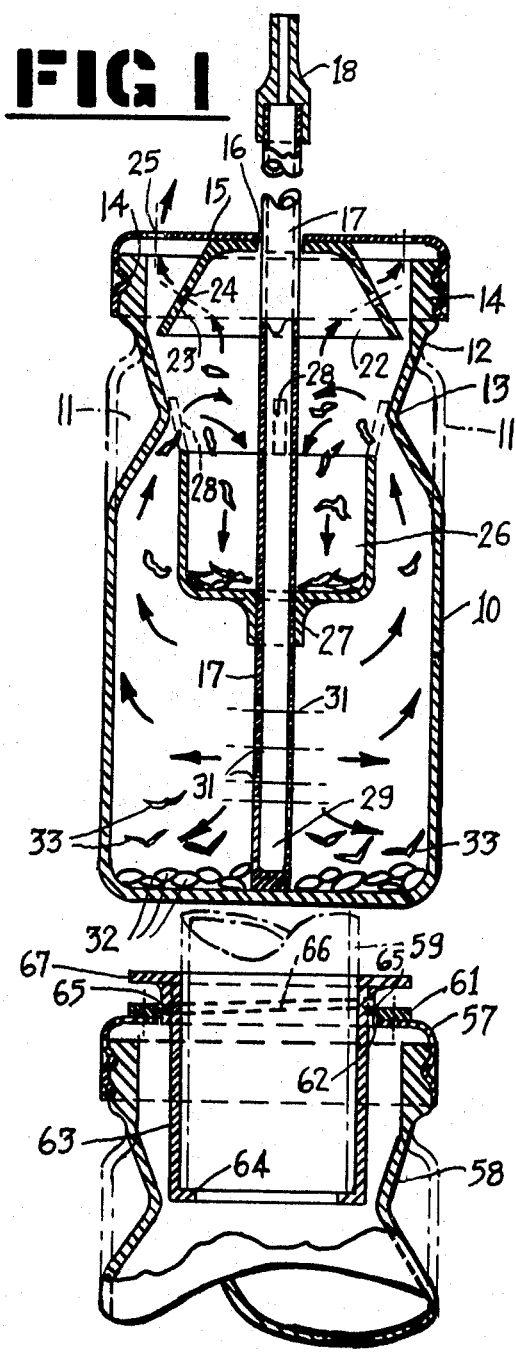
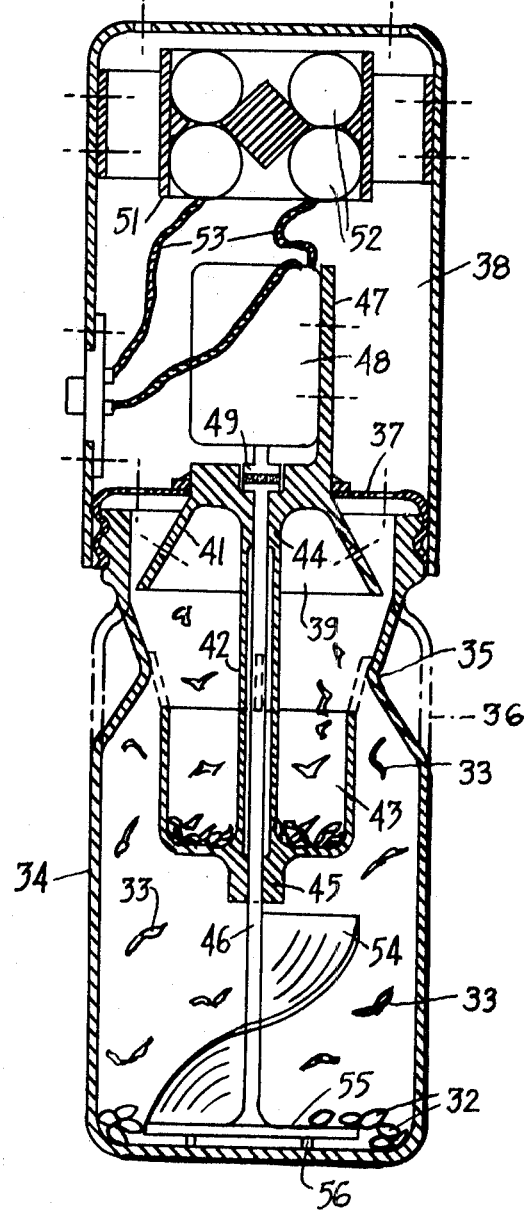
EDWARD L. CICERO INVENTOR.
BY John J. Lynch

BIRD SEED CLEANING DEVICE

Domesticated birds, parakeets, canaries and the like, are particular eaters. Like children, they will eat what they like and prefer the good seeds or "candy" as it were over the vitamin enriched bird seed. If this habit is allowed to continue, the bird's health can be seriously impaired and he will be prone to all types of maladies when he gets older. To fully utilize the nutritionally balanced seed mixtures present day manufacturers prepare, the bird has to be trained to eat the vitamin bearing seed as well as the seeds preferred.

Small cage birds generally pick up and shell the seed in what seems like one continuous motion. The expended husk or hull drops back into the seed cup and after a while the topmost portion of the cup is covered with the spent husks. The bird tends to grope for the good or preferred seeds. However, in a short time of repeatedly coming up with empty shells, he soon gives up. At this point he has eaten all the preferred seeds or "candy" as it were. When the cage is cleaned the next morning, the owner invariably takes the seed cup out of the cage and dumps the whole works into the refuse. The seed cup is refilled with the balanced seed mixture and the whole process is repeated day after day. Not only are the bad nutritional habits of the bird perpetuated but the waste of good seed that has gone into the refuse increases day after day.

It is estimated that approximately two-thirds of the cup's contents is thrown out in this manner. If the owner tries to be thrifty, he will try to separate the husks. One known method is to hold the seed cup inside the neck of a paper bag and gently blow on the top surface of the seed cup. The light husks will fly in all directions. Some get in the eyes of the blower and some will completely miss the bag and spread around where not intended. It is truly a tedious task and an exasperating way of separating the hulls from the good seeds.

All the above devices or means proposed herein are unique and novel, safe efficient, simple and effective, and can be manufactured at relatively low cost. They may employ presently manufactured bird seed containers and can be adapted to the conventional round or a novel hourglass-type container. These units will provide the aforementioned advantages of reclaiming otherwise good seed thrown away in the refuse; easy and efficient separation of the husks; and, if children are involved, can provide an added dimension in the care and maintenance of their caged pet. A further saving is made by the owners of pet shops where a large number of birds are fed daily and wherein, by this means, a big saving can be made in the quantities of seed retrieved by the present bird seed cleaning method and means.

A particular object of the invention is to provide a bird seed cleaning device in which the husks of the seeds discarded by the bird can be quickly and easily separated and isolated from the seeds so that the latter, when replenished in supply, can be returned to the cage with a minimum of effort.

A further object of the invention is to provide a device of the character referred to so that it can be operated by mouth or light air pressure so that the husks alone can be floated, as it were, for isolation in a suitable catch means.

A further object of the invention is to provide a device of the character referred to to be incorporated in one form in a standard jar means into which the bird seed holder, including the unused seeds and the husks, can be easily dumped preparatory to separation or cleaning of the seeds by any of the methods herein mentioned.

Still further objects of the invention include the provision of a motor or a vacuum operated means for applying the cleaning airblast; the provision of means for deflecting the upward floating travel of the husks to a receptacle from which they may be dumped without disturbing the cleaned seeds; to provide various means for applying the necessary air pressure to efficiently float the husks to discharge chamber or receptacle; to provide a jar into which the seeds to be cleaned are initially dumped and which may be shaped as to divert the stream of floated husks into a receptacle where they are held for discharge.

With these and other objects in view, the invention comprises certain constructions hereinafter described and then particularly pointed out in the claims and a preferred embodiment of my invention is illustrated in the accompanying drawing, in which:

FIG. 1 is a view in vertical section through a receptacle constructed in accordance with my invention; the use of a mouth nozzle for supplying air pressure to the jar being shown in full lines while an alternate form of bulb controlled air source is shown in outline, FIG. 2 is a view similar to FIG. 1 showing the mounting on the top of the jar of a motor and battery combination, the parts being so formed that the opening of the screw top lid affords clear access to the bottom of the jar in which the seeds and hulls are held, and FIG. 3 is a fragmentary view in vertical section showing the adaptation of means for receiving the intake end of a vacuum system which may connect a vacuum means such as a cleaner with the jar through the lid thereof, the intake endpiece being removable from the lid.

Referring to the drawing in detail, 10 indicates a cylindrical jar of common form completely shaped as shown in outline as at 11 adjacent the neck or upper end thereof 12; or having an annular constricted portion 13, shown in full lines for a purpose to be later described. The jar has a threaded neck 14 for receiving a screwcap 15 having a central opening 16 for passage of an air pipe 17. The upper end of the latter may have secured thereto a mouthpiece 18 so that air of the breath may be blown through a pipe 17, or the upper end of the pipe can be connected by a hose piece 19 now shown to an air pressure bulb 21 now shown, the latter structure being optional.

The underside of the cap has secured thereto in any suitable manner the bottom of an inverted deflector cup 22 whose depending wall 23 is downwardly and outwardly flared circumferentially and perforated as at 24 with air vents, the cap being also provided with like vents 25 which do not impede the free flow of the air upwardly through the jar. When the cap 15 is unscrewed for removal, deflector cup 22 will go with it and the pipe 17 thereafter being withdrawn will lift with it the husk bowl or cup 26 which is of cylindrical shape, open at the top and secured in any suitable manner to the pipe 17 as by the flange 27. The bowl 26, about its upper edge may be provided with upwardly extended circumferentially spaced tabs 28 for steadying the bowl or cup in the median line of the jar 10 by cooperation with the annularly constricted portion 13 or wall of said jar.

The bottom of the pipe 17 is closed and rests on the bottom of the jar 10 and the closed end thereof constitutes an air equalizing chamber 29, so that air leaving the vents 31 will be of even pressure to float the husks as shown. A number of dot and dash centerlines have been used to indicate the centers of vent holes or fastening means such as rivets or the like. In the operation of the devices the air currents disturb the mixed seeds 32 and husks 33 and cause the latter to float upwardly, as indicated by the arrows which show the upward passage of air to and through the various vents to atmosphere.

The device may be power operated as shown in FIG. 2 and to this end, the jar 34 may be constricted as at 35 or straight as at 36 and threaded at the top to receive a cap 37 to the depending threaded rim of which is frictionally or removably secured in any manner the lower end of a cylindrical combination motor and battery housing 38. The cap 37 has a central opening for the support of a deflector cup 39 somewhat similar in shape to the deflector cup 22 of FIG. 1, and presenting a depending perforated flared circumferential wall 41 and a central tubular section 42 integrally connecting said deflector cup 39 and a husk cup 43 which coact to provide upper and lower bearing sections 44 and 45 respectively for a vertical drive shaft 46 disposed centrally of said jar. The cup 39 is further provided with a vertically disposed mounting extension 47 on which is secured a motor 48 for driving the shaft 46 through a friction clutch 49.

The motor 48 is operated from a battery unit 51 carried in the top of the housing 38, the batteries 52 being connected to the motor 48 by suitable wiring 53. The lower end of shaft 46 carries a helical blade 54 terminating in a lower plate 55 having antifriction projections 56 on the underside thereof, the plate being close enough to the bottom of the jar 34 to prevent seeds from getting thereunder. Shaft 46 is in the axial center of the jar as is the helix 54, the latter creating a gentle air current for floating the husks as the husks and seeds are rotated or gently agitated by the rotation of the plate 55. The helix 54 and its shaft 46 constitute an airstream applying means. Separation of the parts is the same as described for the device of FIG. 1 separation being made by removing the cap 37 and its associated parts.

The device illustrated in FIG. 3 shows the adaptation, to cover 57 for a jar 58, of means for mounting the outlet end of an airhose 59 for a low air pressure supply to the jar and includes a ring 61 secured in any suitable manner about a central hole 62 in the lid or cover 57 of the jar. The hole 62 receives an adapter sleeve 63 of cylindrical form into which the end of the hose 59 frictionally fits to rest at its open end on a bottom flange 64 turned inwardly on the lower rim of said sleeve 63. The ring 61 is provided with one or more inwardly projecting cam pins 65 which engage in a slotted cam track 66 formed in a periphery of a flanged upper end of said adapter sleeve 63, the flange also including a rim portion 67 for manipulation of the adapter sleeve in removing and replacing the same.

My invention is not to be restricted to the precise details of construction shown since various changes and modifications may be made therein without departing from the scope of the invention or sacrificing the advantages to be derived from its use.

What I claim is:

1. In a cleaning device for separating whole seeds and the husks thereof that have been removed from the seeds by caged birds in their feeding activities, the combination of;
   a. a receptacle including a bottom wall for holding, in the bottom thereof, a seed mixture including whole seeds and the husks thereof;
   b. airstream applying means in said receptacle for agitating the mixture in the bottom thereof to float said husks upwardly in the receptacle;
   c. husk receiving means intermediate the top and bottom of the receptacle concentric therewith and having an open top for receiving husks therein, and;
   d. perforate closure means, including perforate deflector cup means connected thereto, for the top of the receptacle detachable therefrom providing for withdrawal of said air supplying means and the husk receiving means from said receptacle, the latter to be emptied of husks and whereby said receptacle may be thereafter emptied of said whole seeds.

2. A cleaning device, as set forth in claim 1, in which:
   a. said receptacle is shaped to provide an annular constricted portion at a point adjacent the upper edge of said husk receiving means for directing the floating stream of husks over said upper edge of the husk receiving means.

3. A cleaning device as set forth in claim 2, in which:
   a. said annular constricted portion of the receptacle extends inwardly intermediate the lower edge of the deflector cup and the upper edge of said husk receiving means, for directing the floating of said husks into said husk receiving means, and
   b. said husk receiving means being secured to said airstream applying means.

4. A cleaning device, as set forth in claim 1, in which:
   a. said airstream applying means is positioned along the vertical axis of the receptacle and constitutes a guide for said husk receiving means.

5. A cleaning device, as set forth in claim 1, in which:
   a. said deflector cup means carried by said closure means overlies said husk receiving means for directing floating husks into the latter, and
   b. said deflector cup means and said husk receiving means being removable with said closure means.

6. A cleaning device as set forth in claim 1,
   a. said airstream applying means being shaped to provide a bottom air chamber and being perforated in the lower portion thereof and extending vertically through said receptacle to emerge beyond the top of said closure means, and
   b. means for applying air to the upper end of said pipe.

7. A cleaning device as set forth in claim 1, in which:
   a. said airstream applying means is freely moveable in the vertical axis of said receptacle and rests on the bottom thereof,
   b. said receptacle being shaped to provide an annular constricted portion adjacent the upper edge of said husk receiving means, and
   c. tab means on said husk receiving means for engagement with said constricted portion for stabilizing the airstream applying means and said husk receiving means.

8. A cleaning device as set forth in claim 1, wherein:
   a. said airstream applying means includes vertically disposed shaft means extending through the top of said receptacle,
   b. a helical rotor means secured to the lower end of said shaft for creating a whirling stream of air of gentle nature to float the husks upwardly to fall into said husk receiving means guided by said deflector means, in which said deflector means comprises an inverted deflector cup, and
   c. a motor mounted on said deflector cup for operating said shaft means,
   d. a housing mounted on said closure means and removable therewith,
   e. motive power means in said housing connected to said motor for operating the same,
   f. friction clutch means connecting said motor and an end of said shaft means, and
   g. an agitator disk at the lower end of said helical rotor.

9. A cleaning device as set forth in claim 8 wherein,
   a. a tubular section means concentric with said drive shaft means connects said deflector cup and said husk receiving means in an integral structure, and
   b. said deflector providing an extension to which said motor is secured.

10. A cleaning device as set forth in claim 1, which,
   a. said closure means includes ring means attached thereto providing an annular opening and inwardly projecting pin portions,
   b. an adapter sleeve means for receiving the end of an air inlet nozzle, said sleeve means fitting closely into said opening and shaped exteriorly to provide an annular cam slot for the reception of said pin portions, whereby the sleeve means can be fixed in place in said opening, and
   c. a flanged rim on the lower end of said sleeve means for seating the end of an airhose positioned therein.